Dec. 14, 1971  L. A. LUEDTKE  3,626,771
V-BELT DRIVE
Filed Feb. 9, 1970
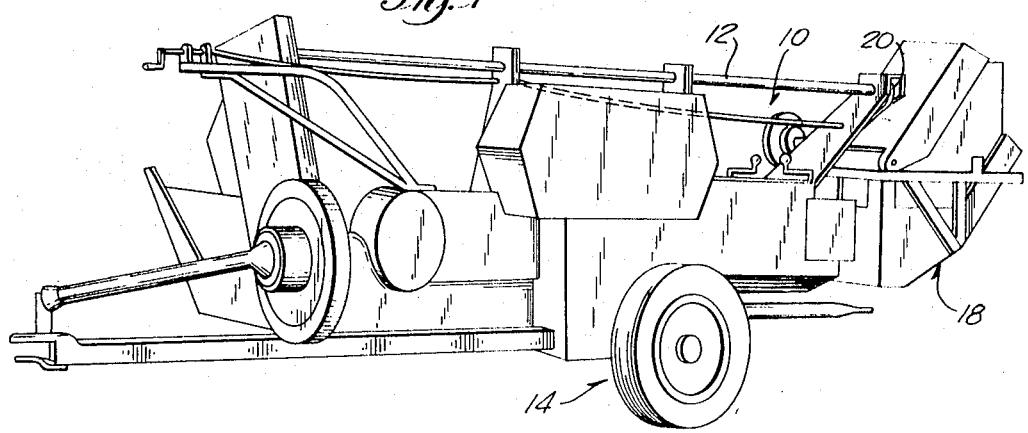
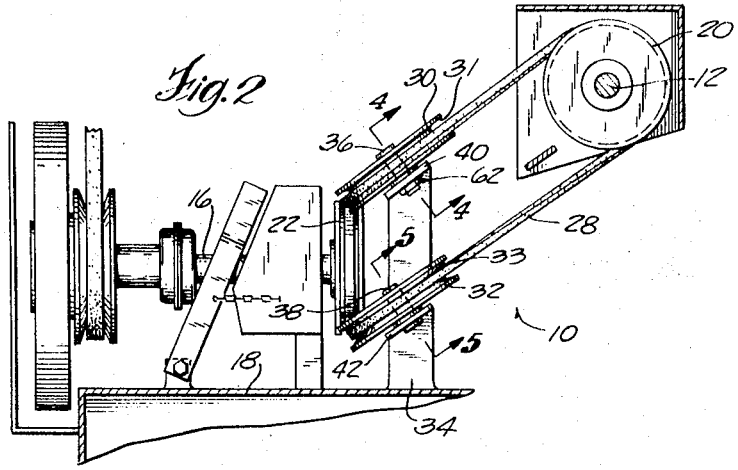
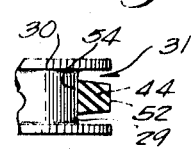
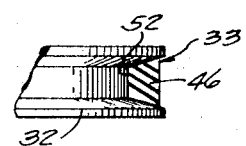
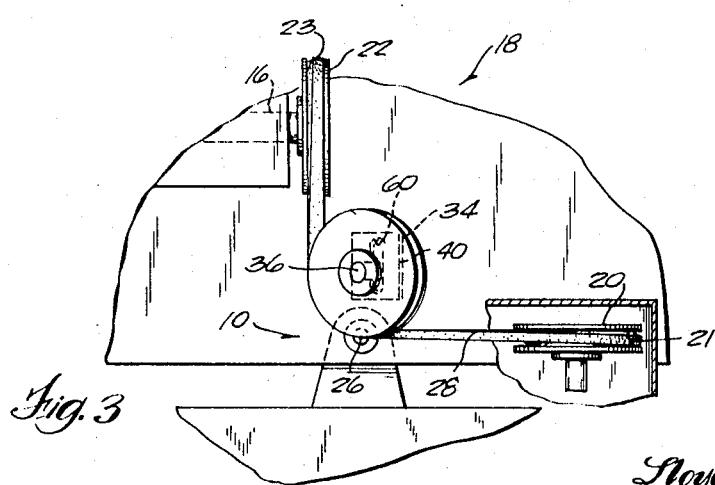
Inventor
Lloyd A. Luedtke
By
Wheeler, Wheeler, House & Clemency
Attorneys United States Patent Office 3,626,771
Patented Dec. 14, 1971

3,626,771
V-BELT DRIVE
Lloyd A. Luedtke, P.O. Box 123, Allenton, Wis. 53002
Filed Feb. 9, 1970, Ser. No. 9,508
Int. Cl. B65g 31/02; F16h 7/24
U.S. Cl. 74—219                                           8 Claims

ABSTRACT OF THE DISCLOSURE

Disclosed herein is a belt drive idler assembly including a pair of idler pulleys mounted in a vertically spaced relation in a position eccentric to the axis of pivotal connection between a baler and a bale thrower and an endless belt reeved around the idler pulleys, a drive pulley mounted on a longitudinally extending drive shaft on the baler and a driven pulley mounted on a drive shaft positioned in a perpendicular relation to the longitudinal axis of the bale thrower. The belt on the upper idler pulley is twisted so that the outer surface of the belt is reeved around the upper idler pulley.

CROSS REFERENCE TO RELATED APPLICATION

The present invention relates to a further development in a belt drive idler assembly for a baler and a bale thrower of the type shown in my copending application Serial No. 619,799, now Pat. No. 3,441,122.

SUMMARY OF THE INVENTION

In the present invention a belt drive idler assembly is provided between a bale forming machine and a bale throwing machine. The idler assembly automatically maintains the tension in the drive belt during lateral movement of the bale throwing machine with rsepect to the bale forming machine. This is accomplished by providing a pair of idler pulleys which are located on the bale throwing machine and which have their axes located eccentric to the vertical axis of the pivotal connection between the bale throwing machine and the bale forming machine. The idler pulleys are angularly offset from the horizontal and are mounted in a vertically spaced relation with the grooves in the idler pulleys aligned with the groove in the drive pulley provided on the baler and the groove in the driven pulley provided on the bale thrower. An endless belt is reeved around the drive and driven pulleys and the idler pulleys.

Tension in the belt is maintained when the bale thrower moves laterally with respect to the baler by either wrapping the belt around the idler pulleys or unwrapping the belt from the idler pulleys depending on the direction of motion.

The belt is prevented from jumping out of the groove of the drive pulley by reeving the outside surface of the belt around the idler pulley on the slack side of the belt.

Other objects and advantages of this invention will become apparent from the following detailed description when read in connection with the accompanying drawings in which:

FIG. 1 is a perspective view showning the position of the belt drive idler assembly between a bale forming machine and a bale throwing machine.

FIG. 2 is a front view of the belt drive idler assembly of this invention shown connected between a drive pulley and a driven pulley.

FIG. 3 is a top view showing the position of the belt drive assembly on the bale throwing machine.

FIG. 4 is a view taken on line 4—4 of FIG. 2 showing the position of the belt in the upper idler pulley.

FIG. 5 is a view taken on lines 5—5 of FIG. 2 showing the position of the belt in the lower idler pulley.

DESCRIPTION OF THE INVENTION

The belt drive idler assembly 10 of this invention is used to transfer power from a drive shaft 12 on a bale forming machine, baler or pulling device 14 to a driven shaft 16 on a bale throwing machine, bale thrower or trailing device 18.

The baler 14 is of the type shown in my copending application Ser. No. 619,799 having a drive shaft 12 extending in the direction of intended travel and supported above and offset from the longitudinal axis of the baler 14 and in a parallel relation thereto. The drive shaft 12 is driven off of a power source located in the forward portion of the baler 14 and is provided at the rearward end of the drive shaft 12 with a drive pulley 20 having a groove 21 positioned in a generally perpendicular relation to the longitudinal axis of the baler 14.

The bale thrower 18 is also shown in my copending application Ser. No. 619,799 and is of the type having two conveyors driven off of the driven shaft 16 which is located in a generally perpendicular relation to the direction of indicated travel. The drive shaft 16 is driven by means of a driven pulley 22 having a groove 23 arranged in a perpendicular relation to the driven shaft 16. The bale thrower or trailing device 18 is pivotally connected to the baler 14 by means of a pivot pin 26 located on the longitudinal axis of the bale thrower 18 and the baler 14. Power for the bale thrower 18 is provided by means of an endless belt 28 reeved around the groove 21 in the drive pulley 20, the groove 23 in the driven pulley 22 and the idler assembly 10.

In accordance with the invention, the endless belt 28 is maintained tight on the drive pulley 20 and the driven pulley 22 during pivotal or lateral swinging movement of the bale thrower 18 with respect to the baler 14 by means of the idler assembly 10. More specifically, the idler asasembly 10 includes a pair of idler pulleys 30 and 32 having peripheral grooves 31 and 33, respectively. The pulleys 30 and 32 are mounted in a generally parallel spaced relation on a bracket 34 which is fixedly mounted on the bale thrower 18. The pulleys 30 and 32 are supported on the bracket 34 by means of pivot pins or studs 36 and 38, respectively, secured to horizontally disposed plates 40 and 42 fixedly mounted on the bracket 34. The plates 40 and 42 extend forwardly from the bracket 34 and are offset from the horizontal at an angle determined by the height of the drive shaft 12 above the assembly 10 as described below. The idler pulleys 30 and 32 are located rearwardly of the vertical axis of the pivot pin 26 at a distance equal to the radius of the idler pulleys 30 and 32 so that the vertical axis of the pivot pin 26 will intersect the periphery of the idler pulleys 30 and 32. The idler pulleys 30 and 32 will then pivot with the bale thrower 18 about the point of intersection of the vertical axis of the pivot pin 26 with the periphery of the idler pulleys 30 and 32.

Means are provided for wrapping or unwrapping the belt 28 from the respective grooves 31 and 33 in the idler pulleys 30 and 32 to take up the slack or relieve the tension in the belt 28 during pivotal movement of the bale thrower 18 about the vertical axis of the pivot pin 26. Such means refers to the eccentric location of the axis of the center of revolution of the idler pulleys 30 and 32 with respect to the vertical axis of the pivot pin 26. Further, in this regard, the drive pulley 20 is shown in FIG. 3 located in a plane generally perpendicular to the longitudinal axis of the baler 14 and tangent to the outer periphery of the idler pulleys 30 and 32 at the points of intersection with the axis of the pivot pin 26. The drive pulley 22 is located in a plane parallel to the longitudinal axis of the bale thrower 18 and tangent to the periphery of the idler pulleys 30 and 32. The distance between the driven pulley 22 and the idler pulleys 30 and 32 remains constant regardless of the lateral position of the bale thrower 18 with respect to the baler 14. The distance of the drive pulley 20 from the idler pulleys 30 and 32 will increase or decrease depending on the direction of swinging movement of the bale thrower 18 with respect to the vertical axis of pivot pin 26. When the bale thrower 18 pivots clockwise, FIG. 3, the idler assembly 10 will move toward the drive pulley 20 and the belt 28 will be wrapped around a greater portion of the periphery of the pulleys 30 and 32, thereby taking up slack in the belt. When the bale throwing machine 18 moves counterclockwise, FIG. 3, the idler assembly 10 will move away from the drive pulley unwrapping the belt from the pulleys 30 and 32 thereby relieving tension in the belt 28.

The distance between the pulleys 30 and 32 is determined by means of the alignment of the grooves 31 and 33 in the pulleys 30 and 32, respectively, with the groove 21 in the drive pulley 20 and with the groove 23 in the driven pulley 22. In this regard the upper idler pulley 30 is shown in FIG. 2 lying in a plane drawn tangent to the groove 21 at the top of the drive pulley 20, and the lower idler pulley 32 is shown lying in a plane drawn tangent to the groove 21 at the bottom of the drive pulley 20. The grooves 31 and 33 in the idler pulleys 30 and 32 are aligned respectively with generally parallel lines drawn tangent to the top and bottom of the driven pulley. In the drawings, both drive and driven pulleys 20 and 22 are shown as having substantially equal diameters. The idler pulleys 30 and 32 will then be located in a parallel spaced relation. If the drive and driven pulleys are of different diameters, then the idler pulleys will not be in a parallel spaced relation.

The belt 28 is prevented from jumping out of the groove 21 in the driven pulley 22 by means of a twist provided in the slack side of the belt 28. This can be seen in FIG. 4 where a portion of the upper idler pulley 30 is shown with a flat surface 29 at the base of the groove 31. The outer surface 54 of the belt 28 is seated on surface 29 of the groove 31 of the upper pulley 32. A portion of the lower idler pulley 32 is shown in FIG. 5 with an inner surface 52 of the belt 28 seated in the tapered groove 33.

In order to adjust the tension in the belt 28, the studs 36 for the upper idler pulley 30 is mounted for movement in a groove 60 provided in the upper plate 40. The stud 36 is retained on the plate 40 by a nut 62 which is wound to allow the stud 36 to be moved. This movement of the upper idler pulley 30 does not detract from the operability of the idler pulley assembly.

Although the drive pulley 20 and the driven pulley 22 have been described with respect to their respective operating functions, the functions could be reversed so that the drive pulley becomes the driven pulley and the driven pulley becomes the drive pulley.

What is claimed is:

1. The combination of a baler having a drive shaft mounted parallel to the direction of intended travel of said baler, a bale thrower having a driven shaft mounted in a vertical plane perpendicular to the direction of intended travel of said bale thrower, means for connecting said bale thrower to said baler for lateral swinging movement about an axis, a drive pulley mounted on said drive shaft in perpendicular relation to said shaft, a pair of idler pulleys mounted on said bale thrower in a vertically spaced relation and rearwardly of the axis of said connecting means, a driven pulley secured to said driven shaft and lying in a plane extending in the direction of intended travel of said bale thrower and tangent to the periphery of said idler pulleys, and an endless belt reeved around said drive pulley, driven pulley and idler pulleys to provide continuous power from said drive pulley to said driven pulley without impairing the free swinging movement of said bale thrower with respect to said baler.

2. A combination according to claim 1 wherein said drive pulley lies in a plane passing through the axis of said connecting means.

3. A combination according to claim 1 wherein said belt has an outer surface reeved around one of said idler pulleys.

4. A combination according to claim 1 wherein said idler pulleys are located rearwardly of said axis of said connecting means at a distance equal to the radius of said idler pulleys.

5. A combination according to claim 1 wherein said upper idler pulley lies in a plane which is tangent to the upper periphery of said driven pulley and said lower idler pulley lies in a plane which is tangent to the lower periphery of said driven pulley.

6. A belt drive idler assembly for transmitting power from a drive pulley normally located at an angle to a driven pulley without impairing free lateral swinging movement of the drive pulley about a pivot axis between the drive pulley and the driven pulley, said assembly comprising a pair of idler pulleys, means for supporting said idler pulleys for rotation about axes fixed with respect to one of the drive and driven pulleys, one of said idler pulleys being positioned in a plane tangent to the top of the periphery of one of the drive pulley and the driven pulley and the other of said idler pulleys being positioned in a plane tangent to the bottom of the corresponding one of the drive pulley and the driven pulley.

7. A belt drive idler assembly according to claim 6 wherein said idler pulleys are located in a spaced relation to the pivot axis.

8. A belt drive idler assembly according to claim 6 wherein said belt has an inner surface reeved around one of said idler pulleys and an outer surface reeved around the other of said idler pulleys.

References Cited

UNITED STATES PATENTS 3,441,122   4/1969   Luedtke _____ 198—128

EDWARD A. SROKA, Primary Examiner

U.S. Cl. X.R.

198—128